United States Patent [19]
Dugan et al.

[11] 3,923,006
[45] Dec. 2, 1975

[54] METHOD AND APPARATUS FOR INCUBATING EGGS

[75] Inventors: James G. Dugan, Littleton, Colo.; Albert S. Hancock, Jr., Orange City, Iowa; Kenneth G. Huston; Bernard L. Rosenberg, both of Denver, Colo.; Shirley M. Smith, Littleton, Colo.; Gene W. Hausske, deceased, late of Palmer Lake, Colo., by Martha J. Hausske, executrix

[73] Assignee: Robbins Incubator Co., Denver, Colo.

[22] Filed: Mar. 25, 1974

[21] Appl. No.: 454,587

Related U.S. Application Data
[63] Continuation of Ser. No. 219,783, Jan. 21, 1972, Pat. No. 3,829,507.

[52] U.S. Cl. .................................................. 119/37
[51] Int. Cl.² ............................................ A01K 41/00
[58] Field of Search ........................... 119/35, 37, 39

[56] References Cited
UNITED STATES PATENTS

| | | | |
|---|---|---|---|
| 2,176,484 | 10/1939 | Blakeslee | 119/37 |
| 2,479,030 | 8/1949 | Taggart | 119/39 X |
| 2,646,930 | 7/1953 | Dryden | 119/37 X |
| 2,791,199 | 5/1957 | Hamnett | 119/35 |

*Primary Examiner*—Hugh R. Chamblee
*Attorney, Agent, or Firm*—Sheridan, Ross & Fields

[57] ABSTRACT

The incubation method comprises placing a rack of eggs in a closed circuit flow path, conditioning and driving air continuously through the path and around the eggs, removing down released by hatching chicks and filtering the air upstream of the blower. Gradual clogging of the filter increases the pressure differential in the circuit, automatically causing the blower to draw in a proportionately increasing amount of fresh air through an upstream inlet and to exhaust waste air from a downstream outlet to improve the air supply and quality in the final stages. Apparatus suitable to perform such method comprises an air conditioning bay and an incubation or hatching bay adjacent thereto, with air conditioning means in one bay and one or more egg racks in the other. Conditioned air is blown from the first bay to the second to maintain optimum environmental conditions around the eggs and to remove down released by hatching chicks. The stale air goes back to the first bay through a filter which gradually becomes more clogged with down and increases the pressure differential. Therefore, the blower draws in increasing amounts of fresh air through an inlet between the filter and the blower and discharges increasing amounts of waste air through an outlet downstream of the blower and filter. Another feature is the provision of means in the hatching bay to divert some of the air flowing past the egg racks and cause it to flow generally perpendicularly to the main stream and between the egg layers to bathe all of the eggs in freshly conditioned air. A further feature is the provision of a self-contained air conditioning unit with a quick detachable connection between the blower and the outlet port of the air conditioning bay to provide for very rapid withdrawal and replacement in case of failure of the unit.

19 Claims, 6 Drawing Figures

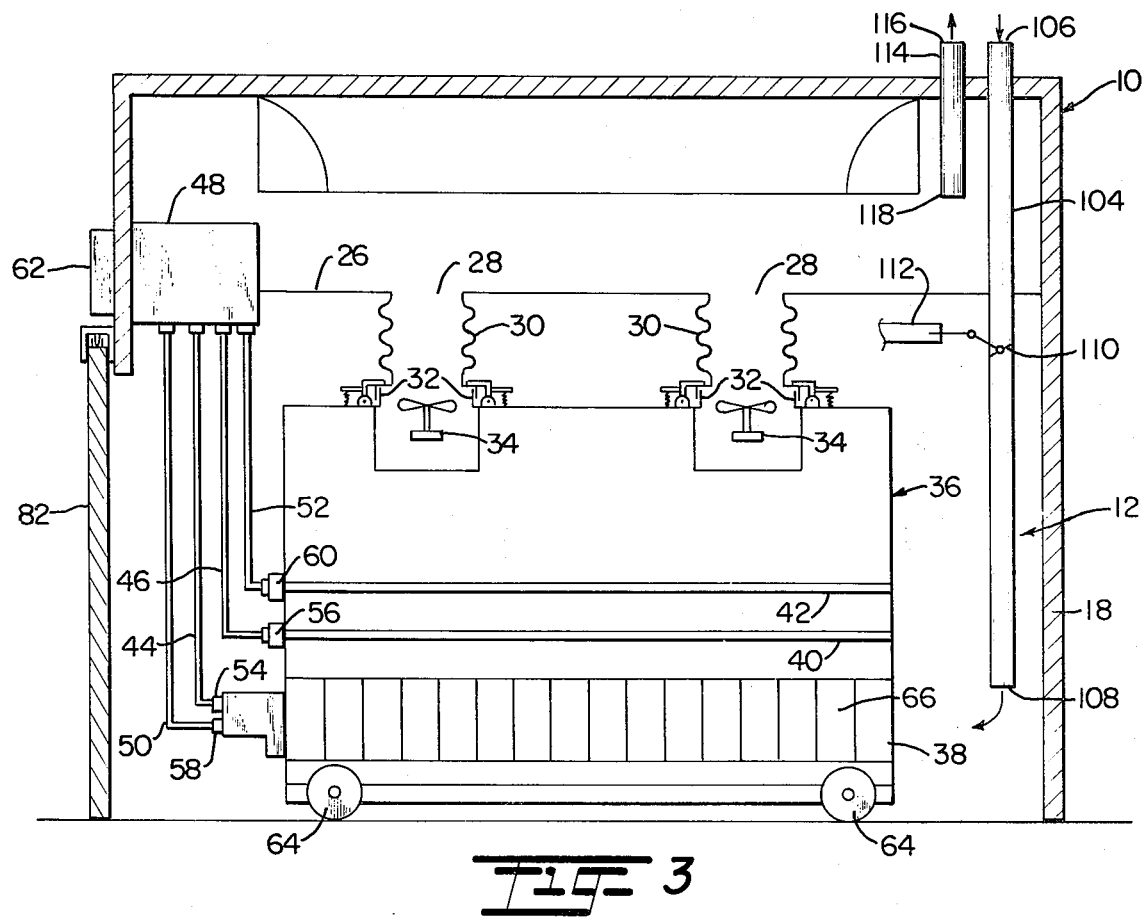
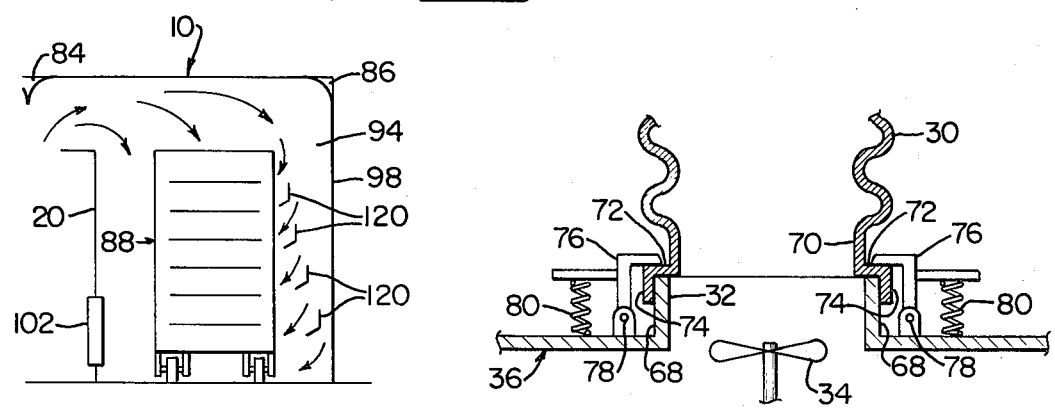
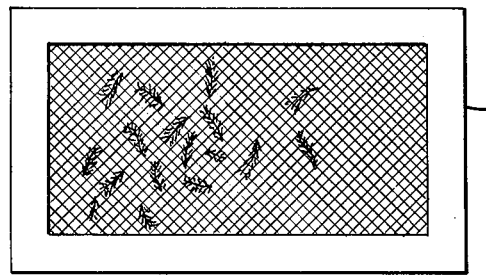

METHOD AND APPARATUS FOR INCUBATING EGGS

This application is a continuation in part of U.S. application Ser. No. 219,783, filed Jan. 21, 1972, now U.S. Pat. No. 3,820,507.

BACKGROUND OF THE INVENTION

The method and apparatus of this invention lie in the field of incubation of eggs, such as chicken, duck, and turkey eggs, and are generally directed to improvements in the provision of environmental conditions for the setting and hatching of the eggs and in the construction and operation of the apparatus involved in the incubation process.

As is well known, apparatus for incubating eggs in commercial quantities requires an enclosure, such as a cabinet, with suitable supports therein for the eggs and appropriate means for circulating air through the cabinet and conditioning same to maintain optimum temperature, humidity, and gaseous mixture conditions.

Many such devices have been proposed and developed in the past and several types have been relatively successful. However, most of them have involved very complicated equipment and controls which entail high first cost and maintenance expense and cause inconvenience in operation and repair. In the event of failure of the air conditioning equipment, for instance, the long period of time needed for replacement or repair may well result in the loss of the entire egg setting or potential hatch, particularly in the hatching operation.

Moreover, most such devices are so constructed that various areas are almost inaccessible for cleaning or repair unless the entire apparatus is shut down and, as stated, such can result in a serious loss, especially during hatching. In addition, guidance and control of the air flow are frequently inadequate to insure uniform conditions for all of the eggs with resultant frequent high loss in certain sections of the machine.

SUMMARY OF THE INVENTION

The present application is in part a continuation of U.S. Pat. application Ser. No. 219,783, filed Jan. 21, 1972, and discloses an invention which obviates certain deficiencies of the prior art previously referred to. While it is particularly directed to the hatcher portion of an incubation apparatus, most of its features are also advantageous for use when the machine is used as a setter.

Generally stated, in its presently preferred form the apparatus or machine to be described provides total control of the air, including the characteristics thereof, which is circulated in the machine. The apparatus includes as a minimum a chamber defining an air conditioning bay and chamber means defining at least one hatching or incubating bay adjacent thereto and preferably in juxtaposition with separate confronting side walls or with a common wall between them. An air discharge port is formed in the upper portion of the air conditioning bay in flow communication with the upper end of the hatching bay, and a return air inlet port is formed in the lower portion of the air conditioning bay in flow communication with the lower end of the hatching bay. Both bays are substantially completely enclosed so that a closed circuit flow path is formed between them. A similar hatching bay may be located at the opposite side of the air conditioning bay and connected in the same way to double the capacity of the apparatus.

The air conditioning means is a self-contained unit including heating, cooling, and humidifying means, and a blower is provided in the upper end of the unit adapted to blow conditioned air upward through the air discharge port from which it flows downward through the hatching bay and back to the unit through the return air inlet port. The blower is provided with a flow control collar which has a quick disconnect fitting to the conduit of the air discharge port. The air conditioning unit is wheel mounted so that it can be rapidly removed from the bay in event of failure and replaced by a spare unit. Quick disconnect fittings are also furnished for the water and electric lines.

The egg supporting means is in the form of a rack adapted to support a plurality of spaced trays of eggs in position to be bathed by conditioned air which flows over them to maintain a constant optimum atmospheric environment. The rack is of less lateral dimensions than the hatching bay, and when it is placed in position it provides an inner air flow space with the wall next to the air conditioning bay and an outer air flow space with the remote, or opposite, wall. The conditioned air flows down around and through the rack to isolate it from all outside influences and returns to the air conditioning bay. In order to obtain adequate flow horizontally between the layers or trays and over all of the eggs, a series of generally horizontally arranged vertically spaced diverter vanes are secured to the outer, remote wall and have angularly disposed faces to intercept a portion of the main stream and cause it to flow generally horizontally between the layers to the inner air flow space, and then down and back to the air conditioning bay.

The air passing over the eggs picks up the down released by the hatching chicks and carries it to the return air inlet port. A filter traverses this port to prevent the down from entering the air conditioning bay, and as more and more down is deposited on the filter it becomes increasingly more clogged and increases the pressure differential across the blower. A fresh air inlet port communicates with the air conditioning bay downstream of the filter and upstream of the blower, and a waste air outlet port communicates with either of the bays downstream of the blower and upstream of the egg rack and filter. As the pressure differential gradually increases, more and more fresh air is drawn in and, correspondingly, more waste air is discharged from the circulating system to decrease the humidity and provide the additional air needed by the increased breathing of the chicks. The size and type of construction of the filter and the sizes and locations of the inlet and outlet are so chosen that the air stream condition is changed at the proper rate to correspond with the change in the needs of the birds to be hatched which will generally be referred to herein as chicks. Thus there is a completely automatic control activated by the chicks themselves, and complicated and expensive control equipment for this purpose is obviated.

BRIEF DESCRIPTION OF THE DRAWINGS

Various other advantages and features of novelty will become apparent as the description proceeds in conjunction with the accompanying drawings, in which:

FIG. 3 is a diagrammatic side elevational view, partly in section, of some of the apparatus of FIG. 2;

FIG. 4 is a vertical sectional view of an exemplary form of quick disconnect fitting for the air conditioning unit;

FIG. 5 is a front elevational view depicting an idealized representation of a filter partially clogged by down; and FIG. 6 is a diagrammatic front elevational view, partly in section, of the apparatus of FIG. 2 with a modified vane arrangement.

DESCRIPTION OF PREFERRED EMBODIMENTS

Figure 1:
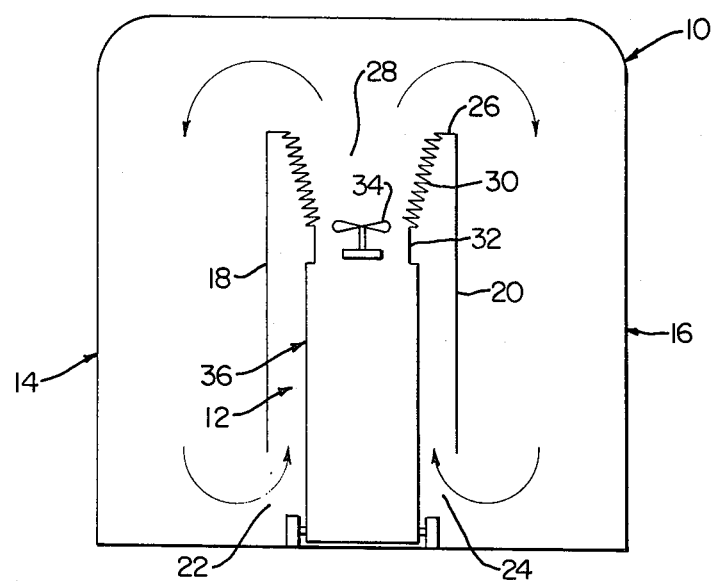
FIG. 1 is a diagrammatic front elevational view, partly in section, of an incubation apparatus having an air conditioning bay and two adjoining incubation bays.

The general arrangement of the apparatus of the invention is diagrammatically illustrated in FIG. 1, in which a generally unitary structure 10 includes a central air conditioning chamber or bay 12 with chamber means on each side defining incubation bays 14, 16 which are adapted to receive egg racks. Walls 18 and 20 serve to divide the structure into separate bays and terminate at their lower ends in openings 22 and 24 which are return air inlet ports. At their upper ends they are connected by horizontal member 26 which constitutes the ceiling or upper wall of the air conditioning chamber, and this wall is formed with opening 28 which is the air discharge port and is provided with a depending bellows-like conduit 30 for quick detachable connection to the fan outlet or flow control conduit 32 for the blower 34 which is located in the upper part of unit 36 containing the entire air conditioning equipment. Upon disconnection of conduit 30 and electrical and water lines, the entire unit may be rolled out of the bay for cleaning or repair and the same or a substitute unit may be rolled in.

Figure 2:
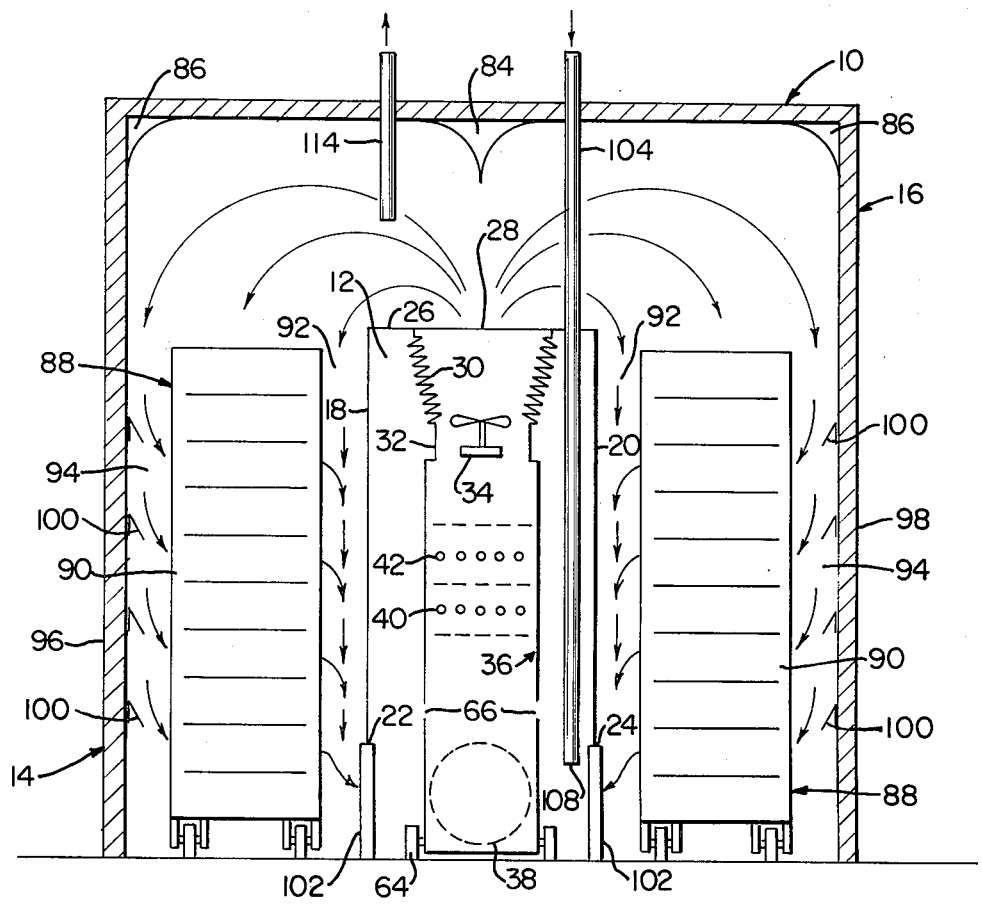
FIG. 2 is a view similar to FIG. 1 showing egg racks in position and other details.

Additional features of the invention are illustrated in FIGS. 2 and 3 which show the same basic structure plus details of various components. While most of the features are useful in both the setting and the hatching portions of an incubation apparatus, they have particular utility in hatching, and consequently the egg containing bays may heretofore and hereafter be referred to either as incubation bays or as hatching bays, and thus in this sense and with respect to the apparatus generally the words "hatching" and "incubation" are used interchangeably throughout the specification and claims.

The air conditioning unit 36 shown is self-contained and is a generally box-like upright device containing a rotary disk humidifier 38 in its lower portion, cooling coils 40 above the humidifier, and heater bars 42 above the cooling coils, all within the casing of unit 36. The sides of the casing are open at the upper portions of the humidifier disks to form air inlets 66 to receive return air from the return air inlet ports 22 and 24. Water lines 44 and 46 lead from control box 48 to the humidifier and the cooling coils, and electric lines 50 and 52 lead from the control box to the humidifier and the heater bars, each of the lines having a quick disconnect coupling 54, 56, 58, and 60 respectively. Control panel 62 is mounted on the exterior of the structure for ready control of all of the functions. It is to be understood that the foregoing elements as well as the location thereof are merely illustrative and that various modifications and substitutes may be made. Also, it may be advisable to separate water lines from the control box for various reasons. For example, water supply and return lines for cooling and a supply line for humidifying purposes can readily be mounted on the panels and partitions with quick disconnect flexible hoses to the conditioning dolly. Unit 36 is mounted on wheels 64 so that after door 82 is opened the unit can be readily and quickly removed from the bay for cleaning. In the event that it should develop a malfunction, it can be immediately replaced by a reserve unit. This is extremely important because a delay of only a few minutes while attempts are made to repair air conditioning equipment in place might well destroy the entire incubation load.

While the quick disconnect fitting between the air outlet 32 of unit 36 and conduit 30 of air discharge port 28 may take various forms, the one schematically illustrated in FIG. 4, is an example of a device suitable for the purpose. The outer wall 68 of member 32 is cylindrical and may be provided with an O-ring seal, not shown. The lower end of conduit 30 is in the form of a ring 70 having an outwardly extending flange 72 and a collar 74 to surround member 32 and seat on its outer end. Latch members 76 are pivoted at 78 and biased by springs 80 to engage over flange 72 and hold the components in coupled relation until manual release is performed.

For operation, unit 36 is rolled into bay 12 and blower 34 is connected to discharge port 28 through members 30 and 32 as just described. The various water and electric lines are connected and the controls appropriately set at panel 62 to provide the proper initial humidity and temperature. Conditioned air is driven upward through port 28, divided into left and right paths by air splitter baffle 84, and directed downward by baffles 86 to flow through the two bays 14 and 16 and return to bay 12 through return air inlet ports 22 and 24 and then into inlets 66 in unit 36. An egg rack 88 containing a plurality of horizontally arranged vertically spaced trays or layers 90 of eggs is located in each of bays 14 and 16 as shown. It is to be understood throughout that reference to horizontally arranged only applies to the hatching operation and with respect to incubation the trays supported by the racks must be periodically tilted to angular positions at each side of tray horizontal position, all as is well known in the art and as referred to in said application Ser. No. 219,783. Thus the term "rack" is to be considered generic to the types described. The racks are of less lateral dimensions than the bays and thus provide inner air flow spaces 92 between the racks and inner walls 18 and 20 and outer air flow spaces 94 between the racks and outer walls 96 and 98 so that the air can flow down at both sides and isolate the racks from outside influences.

The air velocity in the inner spaces is relatively low and in the outer spaces is relatively high. The sudden change of flow direction at the upper ends of the bays causes an adequate amount of air to enter the upper cross channels in the racks formed by the spaced egg layers and flow from the outer air flow spaces to the inner air flow spaces, and likewise the sudden change of flow at the lower ends of the bays causes an adequate amount of air to enter the lower cross channels and flow from the outer air flow spaces to the inner air flow spaces so that excess heat, carbon dioxide, and down will be removed from the eggs and hatching chicks in these layers and brought down to the return air inlet ports 22 and 24.

However, the high velocity air rushing down each outer air flow space tends to bypass all of the layers in the intermediate portion of the trays so that the eggs and chicks therein do not experience optimum environmental conditions. To remedy this problem a series of diverter vanes 100 are located in each outer air flow space. The vanes extend horizontally fore and aft parallel to the sides of the egg racks and are spaced vertically as shown and connected to outer walls 96 and 98 by any suitable support means, such as spaced clips secured to the walls and upon which the vanes rest. Each vane intercepts a portion of the main flow in the outer space and causes it to pass substantially perpendicularly to the main flow and through some of the intermediate egg layer spaces from the outer air flow space to the inner air flow space. It has been determined that about four of such vanes are sufficient to produce uniform conditions in all of the layers of a typical egg rack.

The arrangement shown amounts to a substantially completely closed circuit air circulation system in which all of the air repetitively and continuously flows through the air conditioning unit and blows through the incubation bays and back through return air inlet ports 22 and 24. It is to be understood, of course, that the air circulation path could be reversed. Since the down is released by the chicks in the latter stages of the hatching period and is picked up by the conditioning air and brought down to the return air inlet ports, it would obviously tend to recirculate through the system and spread any disease producing organisms carried thereby through the entire hatch and in any event uncontaminated down is an irritant. To prevent this serious situation a suitably constructed and designed filter 102 is provided to substantially completely traverse each return air inlet port 22 and 24 and filter the air in the system, with all of the down being deposited on the face of the filter. It should also be kept in mind that micro-organisms are carried on dusts and other particulate matter, such as down, and thus filtration and removal of the down removes most of the harmful organisms present in the air. All of the foregoing results in healthier, stronger chicks and, of course, the machine may be more easily cleaned with less labor efforts.

The gradually increasing clogging of the filter by deposition of the chick down thereon makes it possible to set up a novel and practical automatic control system for the addition of increasing amounts of fresh air as needed by the chicks as the hatching operation approaches completion. A fresh air inlet conduit 104 has an outer end 106 in communication with the exterior atmosphere and a port 108 at the inner end within the air conditioning bay upstream of the air conditioning unit and downstream of the filter. A flow control valve 110 is pivotally mounted in an intermediate section of the conduit and operated by a remote control device 112. Normally the valve is set to a particular restriction after some experimentation and thereafter maintained at that setting.

A waste air outlet conduit 114 has an outer end 116 in communication with the exterior atmosphere and a port 118 at the inner end in flow communication with the incubation bay downstream of the air conditioning unit and upstream of the egg rack. It can be seen that waste air is ducted from a clean air area and thus potential contamination of other areas outside of the machine is reduced.

FIG. 5 is an idealized representation of the face of filter 102 after a substantial amount of down has been deposited thereon. It is clear that the down has clogged many of the air passages, and the remaining ones are increasingly restricting the flow of air through the filter with a resultant increase in the pressure differential across the blower. As this differential gradually increases the blower will gradually draw more fresh air in through port 108 and gradually force out more waste air through port 118. This gradual increase improves the air supply and quality and, thus, the air in the circulating system corresponds to the needs of the hatching chicks and it may be said that the chicks themselves create automatic air intake-exhaust control, completely eliminating the need for expensive and complicated control instrumentation and its manipulation.

A modification of the diverter vane arrangement is illustrated in FIG. 6. In this form, vanes 120 are not mounted against the outer wall 98 although they are arranged horizontally and in vertically spaced relation as before. They are suitably supported by means not shown and located between the rack 88 and the outer wall 98 and are staggered across the outer air flow space with the uppermost vane closest to the rack and the lowermost vane closest to the outer wall. With this arrangement, each successive vane intercepts only its relatively inner portion of the total air current and does not disturb the remainder of the air current between it and the outer wall.

What is claiimed is:
1. Incubation apparatus comprising:
a substantially closed chamber defining an air conditioning bay;
chamber means adjacent to the air conditioning bay and defining at least one incubation bay having side walls;
an air discharge port at one end of the air conditioning bay and a return air inlet port at the opposite end of the air conditioning bay;
the two ports communicating with opposite ends of the incubation bay to provide a closed circuit repetitive air circulation path through the bays;
an egg rack located in the incubation bay and spaced from the side walls connecting the opposite ends of the bay to support a plurality of layers of eggs in position to be enveloped on all sides by a current of air passing through the bay from one end to the other along the side walls past the marginal edges of the layers of eggs;
means located entirely within the incubation bay to divert a portion of the air current into flow paths substantially perpendicular to the direction of the main flow path of the air current and cause the portion to pass over all of the eggs in the rack to produce substantially uniform environmental conditions in the vicinity of all of the eggs;
a self-contained air conditioning unit comprising a casing provided with heating means, cooling means, humidifying means, and a blower, all housed completely within the casing;
the casing being located entirely within the air conditioning bay and free standing on the floor thereof and having an air inlet to receive return air from the incubation bay through the return air inlet port and having an air outlet connected to the discharge port to force all of the air to pass through the air conditioning unit;

filter means substantially completely traversing the return air inlet port to filter all of the air passing from the incubation bay to the air conditioning bay and adapted to become increasingly clogged with down deposited from hatching chicks;

a fresh air inlet port in flow communication with the air conditioning bay upstream of the air conditioning unit and downstream of the filter means and communicating with the exterior atmosphere;

and a waste air outlet port in flow communication with the incubation bay downstream of the air conditioning unit and upstream of the filter means and egg rack and communicating with the exterior atmosphere;

the filter means serving as a control unit to gradually increase the differential pressure in the circulating system as the filter means becomes progressively more clogged and cause the air conditioning unit to draw in increasing amounts of fresh air through the fresh air inlet port and to discharge increasing amounts of waste air through the waste air outlet port.

2. Apparatus as claimed in claim 1; in which
the air outlet of the air conditioning unit is provided with a quick detachable connection to the discharge port;
and the unit is movably mounted for rapid removal and replacement in the air conditioning bay.

3. Apparatus as claimed in claim 1; in which
the means to divert a portion of the air current to flow across the eggs comprises angularly directed baffle means located in the flow path of the circulating air current.

4. Incubation apparatus comprising:
a substantially closed chamber defining an air conditioning bay;
chamber means adjacent to the air conditioning bay and defining at least one incubation bay;
an air discharge port at one end of the air conditioning bay and a return air inlet port at the opposite end of the air conditioning bay;
the two ports communicating with opposite ends of the incubation bay to provide a closed circuit repetitive air circulation path through the bays;
an egg rack located in the incubation bay to support a plurality of layers of eggs in position to be enveloped by a current of air flowing through the bay;
and a self-contained air conditioning unit comprising a casing provided with heating means, cooling means, humidifying means, and a blower, all housed completely within the casing;
the casing being located entirely within the air conditioning bay and free standing on the floor thereof and having an air inlet to receive return air from the incubation bay through the return air inlet port and having an air outlet directly connected to the discharge port to force all of the air to pass through the air conditioning unit;
the air outlet having a quick detachable connection to the discharge port, and the air conditioning unit being movably mounted on the floor for rapid total removal and replacement in the air conditioning bay.

5. Apparatus as claimed in claim 4; in which
the air conditioning unit is an upright machine mounted on rollers for ready movement into and out of the bay;
the air inlet is in the lower part of the unit to receive return air from the lower part of the bay;
the air outlet comprises a conduit extending upward from the top of the unit;
the bay has a ceiling spaced above the unit;
and the discharge port is a conduit mounted in the ceiling of the bay and projects downward to engage the air outlet in substantial sealing relationship.

6. Incubation apparatus comprising:
a substantially closed chamber defining an air conditioning bay;
chamber means adjacent to the air conditioning bay and defining at least one incubation bay having side walls;
an air discharge port at one end of the air conditioning bay and a return air inlet port at the opposite end of the air conditioning bay;
the two ports communicating with opposite ends of the incubation bay to provide a closed circuit repetitive air circulation path through the bays;
an egg rack located in the incubation bay and spaced from the side walls connecting the opposite ends of the bay to support a plurality of layers of eggs in position to be enveloped on all sides by a current of air passing through the bay from one end to the other along the side walls past the marginal edges of the layers of eggs;
an air conditioning unit located in the air conditioning bay and having an air inlet to receive return air from the incubation bay through the inlet port and having an air outlet connected to the discharge port to force all of the air to pass through the air conditioning unit;
and means located entirely within the incubation bay to divert a portion of the air current into flow paths substantially perpendicular to the direction of the main flow path of the air current and cause the portion to pass over all of the eggs in the rack to produce substantially uniform environmental conditions in the vicinity of all of the eggs in the egg rack.

7. Apparatus as claimed in claim 6; in which
the means for diverting a portion of the air current comprises a plurality of vanes located in a position to intercept the air current and angularly arranged to impart components of motion in directions generally perpendicular to the direction of the main flow path.

8. Apparatus as claimed in claim 7; in which
the air conditioning bay is an upright chamber having the air discharge port in its upper portion and the return air inlet port in its lower portion;
the incubation bay is an upright chamber having its upper end in flow communication with the air discharge port and its lower end in flow communication with the return air inlet port;
the air conditioning unit has a blower arranged to cause upward flow through the air conditioning bay and downward flow through the incubation bay with the air current flowing down around the sides of the egg rack to isolate it from the walls of the incubation bay;
and the diverter vanes are located in the current flowing between the rack and the wall remote from the air conditioning bay to divert portions of the air current into horizontal directions to flow between the egg layers and bathe all of the eggs in the conditioned air of the main current.

9. Apparatus as claimed in claim 8; in which
the vanes are arranged horizontally and in vertically spaced relation and are secured to the remote wall of the incubation bay.

10. Apparatus as claimed in claim 8; in which
the vanes are arranged horizontally and in vertically spaced relation between the rack and the remote wall and are staggered across the space between them with the uppermost vane closest to the rack and the lowermost vane closest to the remote wall.

11. Apparatus as claimed in claim 8; in which
the vanes are arranged horizontally and in vertically spaced relation;
and the uppermost vane is below the top of the rack and the lowermost vane is above the bottom of the rack.

12. Hatching apparatus comprising:
chamber means for enclosing a plurality of eggs to be hatched;
rack means located in the chamber means to support a plurality of vertically spaced layers of eggs in position to be traversed by a current of conditioned air passing generally horizontally between the various layers from a first side of the rack means to a second side of the rack means;
air conditioning means, including a blower, in closed circuit flow communication with the rack means and arranged to continuously deliver conditioned air to the first side of the rack means and withdraw return air from the second side of the rack means in a repetitive circulation through the closed circuit flow path;
filter means substantially completely traversing the return air portion of the flow path between the second side of the rack means and the suction side of the blower to filter the air passing from the second side of the rack means to the blower, and adapted to become increasingly clogged with down deposited thereon from hatching chicks;
a fresh air inlet port in flow communication with the closed circuit flow path upstream of the blower and downstream of the filter means and communicating with the exterior atmosphere;
and a waste air outlet port in flow communication with the closed circuit flow path downstream of the blower and upstream of the filter means and rack means and communicating with the exterior atmosphere;
the filter means serving as a control unit to gradually increase the differential pressure in the circulating system as the filter means becomes progressively more clogged and causes the blower to draw in increasing amounts of fresh air through the fresh air inlet port and to discharge increasing amounts of waste air through the waste air outlet port.

13. Hatching apparatus comprising:
a substantially closed chamber defining an air conditioning bay;
chamber means adjacent to the air conditioning bay and defining at leas one hatching bay;
an air discharge port in one part of the air conditioning bay and a return air inlet port in another part of the air conditioning bay;
the two ports communicating with spaced portions of the hatching bay to provide a closed circuit repetitive air circulation path through the bays;
an egg rack located in the hatching bay to support a plurality of layers of eggs in position to be enveloped by a current of air passing through the bay;
air conditioning means, including a blower, located in the air conditioning bay and having an air inlet to receive return air from the hatching bay through the return air inlet port and having an air outlet from the blower connected to the discharge port to force all of the air to pass through the air conditioning unit;
filter means substantially completely traversing the return air inlet port to filter substantially all of the air passing from the hatching bay to the air conditioning bay, and adapted to become increasingly clogged with down deposited thereon from hatching chicks;
a fresh air inlet port in flow communication with the air conditioning bay upstream of the blower and downstream of the filter means and communicating with the exterior atmosphere;
and a waste air outlet port in flow communication with the hatching bay downstream of the blower and upstream of the filter means and egg rack and communicating with the exterior atmosphere;
the filter means serving as a control unit to gradually increase the differential pressure in the circulating system as the filter means becomes progressively more clogged and cause the air conditioning unit to draw in increasing amounts of fresh air through the fresh air inlet port and to discharge increasing amounts of waste air through the waste air outlet port.

14. Apparatus as claimed in claim 13; in which
the air conditioning bay is an upright chamber having the air discharge port in its upper portion and the return air inlet port in its lower portion;
the hatching bay is an upright chamber having its upper end in flow communication with the air discharge port and its lower end in flow communication with the return air inlet port;
the blower of the air conditioning means is arranged to cause upward flow through the air conditioning bay and downward flow through the hatching bay;
the egg rack is of less lateral dimensions than the hatching bay and is located therein to provide an inner air flow space between the rack and the inner wall of the bay adjacent to the air conditioning bay and an outer air flow space between the rack and the opposite wall of the hatching bay;
and means is arranged in the outer air flow space to divert a portion of the downward air current therein and cause it to flow generally horizontally between the egg layers, bathing all of the eggs and picking up the down shed by hatching chicks and delivering it to the downward air current in the inner air flow space for transport to the filter means.

15. A method of hatching eggs comprising:
establishing a closed circuit air flow path;
locating a plurality of eggs in a hatching zone in the flow path;
establishing a pressure transition zone in the flow path spaced from the hatching zone;

delivering pressurized air from a first side of the pressure transition zone to flow along a first portion of the air flow path to a first side of the hatching zone and bathe the eggs therein;

withdrawing air at lower pressure from the second side of the hatching zone to flow through a second portion of the flow path back to a second side of the pressure transition zone;

conditioning the air in the vicinity of the pressure transition zone to provide proper environmental conditions for the eggs and hatching chicks;

utilizing the air flowing through the hatching zone to withdraw down released by the hatching chicks and transporting it along the second portion of the flow path toward the pressure transition zone;

filtering the return flow air at a filtering zone in the second portion of the flow path upstream of the pressure transition zone and causing the down to be deposited in the filtering zone, and gradually increasingly restricting the flow path in response to increasing deposits of down with a gradually increasing resultant pressure differential across the pressure transition zone;

and gradually drawing increasing amounts of fresh air into the flow path upstream of the pressure transition zone and downstream of the filtering zone and gradually discharging increasing amounts of waste air from the flow path downsteam of the pressure transition zone and upstream of the first side of the hatching zone in response to the increasing pressure differential.

16. Incubation apparatus comprising:

a substantially closed upright chamber having side walls and a ceiling and floor defining an air conditioning bay;

upright chamber means forming an incubation bay laterally adjacent to the air conditioning bay and having a first upright wall adjacent to the air conditioning bay and a second, opposite, upright wall remote from the air conditioning bay to define with the first wall a vertical flow path for conditioning air;

an air discharge port at the upper end of the air conditioning bay and a return air inlet port at the lower end of the air conditioning bay;

the two ports communicating respectively with the upper and lower ends of the incubation bay to provide a closed circuit repetitive air circulation path through the bays;

an egg rack located in the incubation bay and being formed with substantially smaller lateral dimensions to provide inner and outer passages for the downward flow of conditioning air between the rack and the adjacent and remote walls past the marginal edges of layers of eggs supported generally horizontally in the rack;

and a self-contained air conditioning unit comprising a casing provided with heating means, cooling means, humidifying means, and a blower, all housed completely within the casing;

the casing being located entirely within the air conditioning bay and being provided with rollers to mount it for free movement on the floor of the bay for rapid total removal and replacement in the bay;

an air inlet in the lower portion of the casing to receive return air from the incubation bay through the return air inlet port, and an air outlet at the upper end of the casing directly connected to the discharge port to force all of the air to pass through the air conditioning unit;

and a quick detachable coupling sealingly connecting the air outlet to the discharge port.

17. Apparatus as claimed in claim 16; in which the egg rack is both shorter and narrower than the incubating bay and is positioned to provide for downward flow of conditioning air between the rack and all vertical walls of the bay to totally isolate the rack from environmental conditions outside the walls;

and the rack is roller mounted on the floor of the bay for rapid total removal and replacement as a unit.

18. Incubation apparatus comprising:

a substantially closed upright chamber having side walls and a ceiling and floor defining an air conditioning bay;

upright chamber means forming an incubation bay laterally adjacent to the air conditiong bay and having a first upright wall adjacent to the air conditioning bay and a second, opposite, upright wall remote from the air conditioning bay to define with the first wall a vertical flow path for conditioning air;

an air discharge port at the upper end of the air conditioning bay and a return air inlet port at the lower end of the air conditioning bay;

the two ports communicating respectively with the upper and lower ends of the incubation bay to provide a closed circuit repetitive air circulation path through the bays;

an egg rack located in the incubation bay and being formed with substantially smaller lateral dimensions to provide inner and outer passages for the downward flow of conditioning air between the rack and the adjacent and remote walls past the marginal edges of layers of eggs supported generally horizontally in the rack;

an air conditioning unit located in the air conditioning bay and having an air inlet to receive return air from the incubation bay through the inlet port and having an air outlet connected to the discharge port to force all of the air to pass through the air conditioning unit and flow downward through the incubation bay;

and means located entirely within the incubation bay in one of the air flow passages between the rack and the walls to divert a portion of the air current into substantially horizontal flow paths to pass over all of the eggs in the rack to produce substantially uniform environmental conditions in the vicinity of all of the eggs in the rack and join the downward air flow in the opposite passage to carry undesirable products to the bottom of the bay.

19. Hatching apparatus comprising:

a substantially closed upright chamber having side walls and a ceiling and floor defining an air conditioning bay;

upright chamber means forming a hatching bay laterally adjacent to a side wall of the air conditioning bay and having side walls defining a vertical flow path for conditioning air;

an air discharge port at the upper end of the air conditioning bay and a return air inlet port at the lower end of the air conditioning bay;

the air discharge port communicating with the upper end of the hatching bay and the return air inlet port communicating with the lower end of the hatching bay to provide a closed circuit repetitive air circulation path through the bays;

an egg rack in the hatching bay formed with substantially smaller lateral dimensions than the bay and located therein to provide passages between at least two opposite sides of the rack and their facing walls for downward flow of air past the marginal edges of layers of eggs supported generally horizontally in the rack and accompanying flow of air across the layers of eggs from one passage to the other;

air conditioning means, including a blower, located in the air conditioning bay and having an air inlet to receive return air from the bottom of the hatching bay through the return air inlet port and having an air outlet from the blower connected to the discharge port to force all of the air to pass through the air conditioning means upward in the air conditioning bay and downward in the hatching bay;

filter means substantially completely traversing the return air inlet port to filter substantially all of the air passing from the lower end of the hatching bay to the air conditioning bay, and adapted to become increasingly clogged with down deposited thereon from the hatching chicks;

a fresh air inlet port in flow communication with the interior of the air conditioning bay between the filter means and the blower and communicating with the exterior atmosphere;

and a waste air outlet port in flow communication with the upper end of the hatching bay above the egg rack and communicating with the exterior atmosphere;

the filter means serving as a control unit acting in response to gradual increase in the amount of clogging to decrease pressure in the air conditioning chamber and cause the blower to draw in increasing amounts of fresh air and to increase pressure in the hatching bay to discharge increasing amounts of waste air.

* * * * *

UNITED STATES PATENT OFFICE
CERTIFICATE OF CORRECTION

Patent No. 3,923,006                Dated Dec. 2, 1975

Inventor(s) James G. Dugan, et al.

It is certified that error appears in the above-identified patent and that said Letters Patent are hereby corrected as shown below:

On the first page, in item "[63]", the correct patent number is No. 3,820,507.

Column 1, line 33, correct the spelling of "inaccessible".

Signed and Sealed this second Day of March 1976

[SEAL]

*Attest:*

RUTH C. MASON
*Attesting Officer*

C. MARSHALL DANN
*Commissioner of Patents and Trademarks*